(12) United States Patent
Ban et al.

(10) Patent No.: US 11,343,872 B2
(45) Date of Patent: May 24, 2022

(54) METHOD AND APPARATUS FOR DETECTION ADJACENT CHANNEL INTERFERENCE SIGNAL USING CHANNEL INFORMATION IN MAC FRAME

(71) Applicant: Dialog Semiconductor Korea Inc., Seongnam-si (KR)

(72) Inventors: Jae Jun Ban, Seongnam-si (KR); Jae Wan Kim, Seongnam-si (KR); Won Man Kim, Seongnam-si (KR); Beom Jin Kim, Seongnam-si (KR)

(73) Assignee: Dialog Semiconductor Korea Inc., Gyeonggi-Do (KR)

( * ) Notice: Subject to any disclaimer, the term of this patent is extended or adjusted under 35 U.S.C. 154(b) by 60 days.

(21) Appl. No.: 16/679,356

(22) Filed: Nov. 11, 2019

(65) Prior Publication Data
US 2020/0154514 A1 May 14, 2020

(30) Foreign Application Priority Data

Nov. 12, 2018 (KR) .......................... 10-2018-0137944

(51) Int. Cl.
| | |
|---|---|
| *H04N 1/00* | (2006.01) |
| *H04W 80/02* | (2009.01) |
| *H04W 72/04* | (2009.01) |
| *H04B 1/7097* | (2011.01) |
| *H04N 21/443* | (2011.01) |
| *H04W 36/02* | (2009.01) |
| *H04L 43/022* | (2022.01) |

(52) U.S. Cl.
CPC .......... *H04W 80/02* (2013.01); *H04B 1/7097* (2013.01); *H04N 1/00766* (2013.01); *H04N 21/4435* (2013.01); *H04W 72/0446* (2013.01); *H04L 43/022* (2013.01); *H04W 36/02* (2013.01)

(58) Field of Classification Search
CPC ... H04B 1/001; H04B 1/0035; H04L 63/0876; H04L 43/022; H04N 7/083; H04N 1/00766; H04N 21/4435; H04W 74/002; H04W 36/02
See application file for complete search history.

(56) References Cited

U.S. PATENT DOCUMENTS

| | | | | |
|---|---|---|---|---|
| 2015/0009878 | A1* | 1/2015 | Kim | H04W 4/70 370/311 |
| 2016/0316473 | A1* | 10/2016 | Wang | H04W 74/0816 |
| 2017/0237532 | A1* | 8/2017 | Li | H04L 5/0007 370/338 |
| 2018/0278308 | A1* | 9/2018 | Jin | H04B 7/0619 |

\* cited by examiner

*Primary Examiner* — Salvador E Rivas
(74) *Attorney, Agent, or Firm* — Saile Ackerman LLC; Stephen B. Ackerman

(57) ABSTRACT

A method and an apparatus for filtering a wireless signal by parsing a wireless signal transmitted from a surrounding wireless terminal so as to extract channel information of the surrounding wireless terminal in a MAC frame and performing adaptive filtering on the wireless signal.

8 Claims, 4 Drawing Sheets

(a)

(b)

METHOD AND APPARATUS FOR DETECTION ADJACENT CHANNEL INTERFERENCE SIGNAL USING CHANNEL INFORMATION IN MAC FRAME

RELATED APPLICATION

This application claims the benefit of priority of Korean Patent Application No. 10-2018-0137944 filed on Nov. 12, 2018, the contents of which are incorporated herein by reference in their entirety.

FIELD AND BACKGROUND OF THE INVENTION

The present disclosure relates to a method and an apparatus for filing a wireless signal, and in particular, to a method and an apparatus for performing adaptive filtering on a wireless signal by yielding channel information corresponding to the wireless signal.

The contents described in this section simply provide background information with regard to an embodiment only, and do not constitute prior art thereof.

In a current communications system, solutions have been proposed for transmitting/receiving a large volume of data to/from a plurality of users by efficiently using limited frequency channels. In particular, in a current WLAN system, when a base station, such as an access point (AP), and a plurality of terminals corresponding to a plurality of users, such as stations (STAs), transmit/receive data via the limited frequency channels, solutions have been proposed for normally transmitting/receiving the data by efficiently using the limited frequency channels.

However, in a current WLAN system mentioned above, when allocating the limited frequency channels to the plurality of STAs and, in turn, transmitting/receiving the data via allocated frequency channels, adjacent frequency channels may be allocated to the plurality of STAs. When transmitting/receiving the data via the allocated frequency channels, interference between the adjacent channels of the allocated frequency channels, i.e. an ACI, may be caused, as illustrated in FIG. 1, whereby the data cannot be normally transmitted/received due to the ACI.

SUMMARY OF THE INVENTION

It is an object of an embodiment to parse a wireless signal transmitted from a surrounding wireless terminal so as to yield channel information of the surrounding wireless terminal in a Media Access Control (MAC) frame and perform adaptive filtering on the wireless signal based on the yielded channel information, thereby addressing a problem of efficiency reduction in the use of buffers in a memory, which is caused by the reception of adjacent channel interference signals.

An embodiment provides a wireless terminal, including: a channel setting portion configured to collect user setting information of a target channel to be permitted in association with data buffering to a memory area; a signal receiving portion configured to receive a wireless signal transmitted from at least one surrounding wireless terminal; and a signal processing portion configured to parse the wireless signal so as to extract channel information corresponding to the surrounding wireless terminal in a MAC frame (Mac Protocol Data Unit, MPDU) of the wireless signal and perform adaptive filtering on the wireless signal based on the user setting information and the channel information.

In addition, according to another aspect, an embodiment provides a computer program stored in a computer-readable recording medium, wherein the computer program, when combined with hardware, performs: a process of collecting user setting information of a target channel to be permitted in association with data buffering to a memory area; a process of receiving a wireless signal transmitted from at least one surrounding wireless terminal; and a process of parsing the wireless signal so as to extract channel information corresponding to the surrounding wireless terminal in a MAC frame (i.e. Mac Protocol Data Unit, MPDU) of the wireless signal and performing adaptive filtering on the wireless signal based on the user setting information and the channel information.

Furthermore, according to still another aspect, an embodiment provides a method for filtering a wireless signal, including the steps of: collecting user setting information of a target channel to be permitted in association with data buffering to a memory area; receiving a wireless signal transmitted from at least one surrounding wireless terminal; and parsing the wireless signal so as to extract channel information corresponding to the surrounding wireless terminal in a MAC frame (Mac Protocol Data Unit, MPDU) of the wireless signal and performing adaptive filtering on the wireless signal based on the user setting information and the channel information.

As described above, according to an embodiment, a problem of efficiency reduction in the use of buffers in a memory due to the reception of adjacent channel interference signals can be addressed by parsing a wireless signal transmitted from a surrounding wireless terminal so as to yield channel information of the surrounding wireless terminal in a MAC frame and performing adaptive filtering on the wireless signal based on the yielded channel information.

DESCRIPTION OF SPECIFIC EMBODIMENTS OF THE INVENTION

Hereinafter, with reference to the appended drawings, an embodiment is described in detail.

As mentioned above, in a current WLAN system, when allocating limited frequency channels to a plurality of STAs and, in turn, transmitting/receiving data via the allocated frequency channels, interference between the adjacent channels, i.e. an ACI, may be caused.

Figure 1:
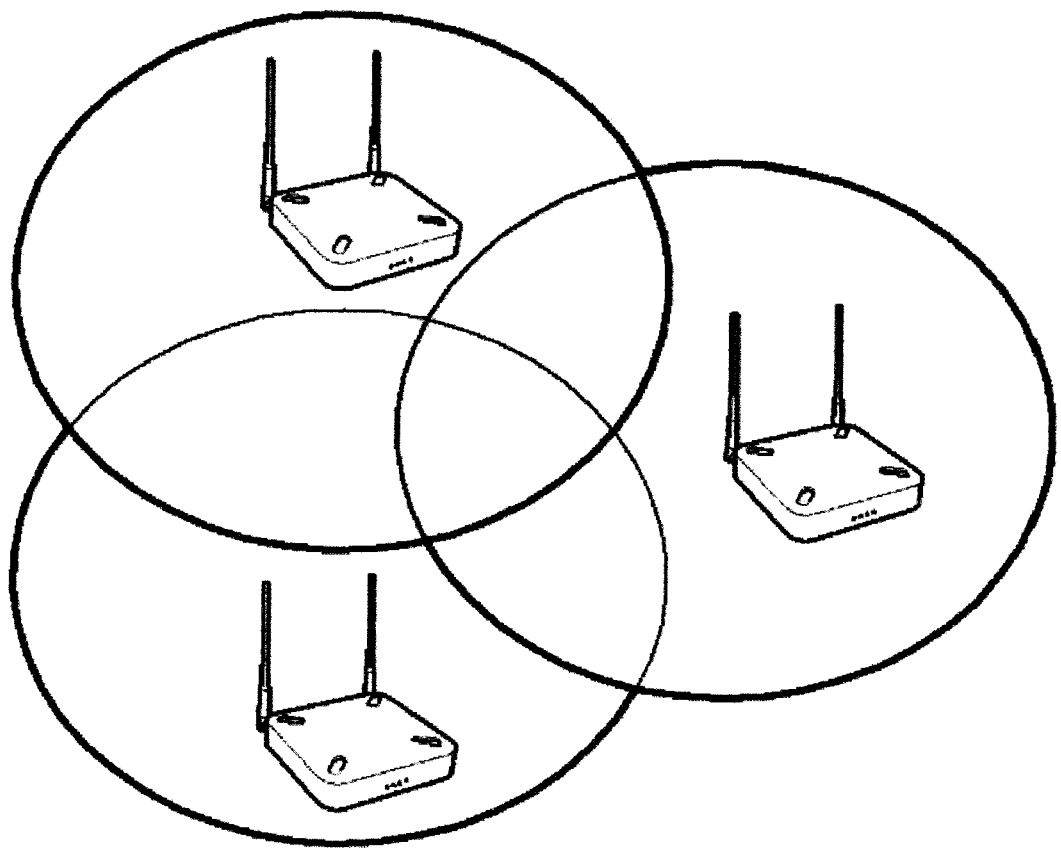
FIGS. 1 and 2 are exemplary diagrams illustrating adjacent channel interference signals to be filtered, according to an embodiment.
Figure 2:
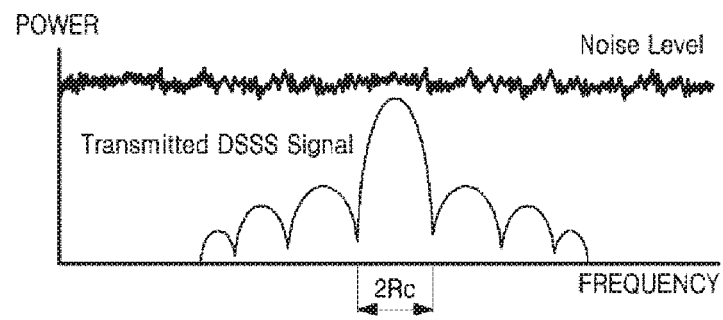
Figure 2:
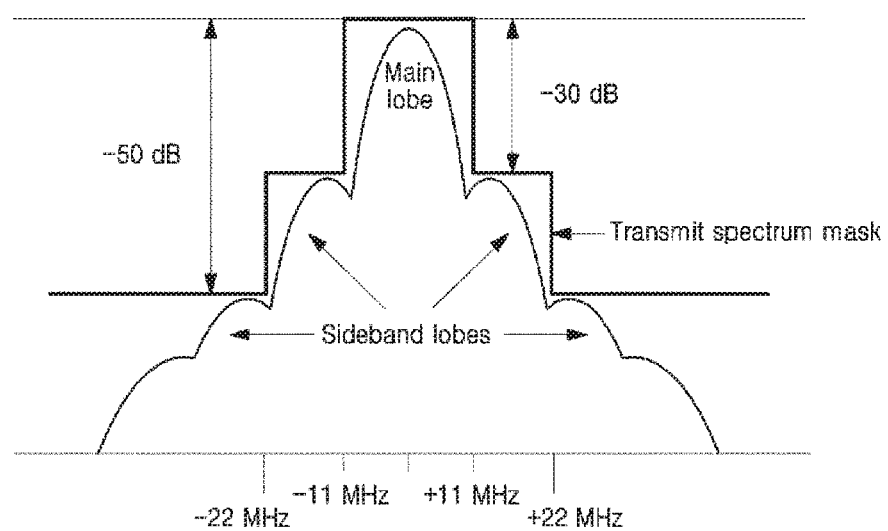

In the meantime, a conventional wireless terminal could not correctly identify a wireless signal received from a surrounding wireless terminal, even in the case that such a wireless signal is an ACI, whereby unnecessary data is buffered in the buffer area of a memory. For instance, referring to FIGS. 2 (a) and (b), if a wireless signal received from the surrounding wireless terminal is a wireless signal transmitted according to Direct Sequence Spread Spectrum (DSSS) technology, even in the case that the wireless signal is an ACI, the wireless signal is buffered in a memory area since it is originally a wide-band signal and requires a significantly low level of signal-to-noise ratio even though the power of the ACI portion is reduced by a Tx Spectrum Mask. Thus, it causes a problem of inefficiency in operating a memory having a limited buffer size.

With regard thereto, there is proposed an embodiment to parse a wireless signal transmitted from a surrounding wireless terminal so as to yield channel information of the surrounding wireless terminal in a MAC frame and perform adaptive filtering on the wireless signal based on the yielded channel information, thereby addressing a problem of efficiency reduction in the use of buffers in a memory due to a reception of the interference signals of adjacent channels.

Figure 3:
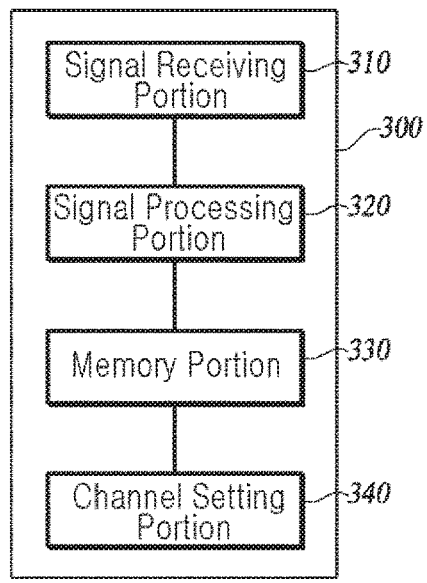
FIG. 3 is a block diagram schematically illustrating a wireless terminal, according to an embodiment.

FIG. 3 is a block diagram schematically illustrating a wireless terminal, according to an embodiment.

In the present embodiment, a wireless terminal 300 may be an access point (AP) device configured to convert a wired Internet signal provided by an Internet Service Provider (ISP) into a wireless signal. On the contrary, the wireless terminal 300 may be a station (STA) device configured to receive a wireless LAN signal provided by an AP device. However, the wireless terminal 300 of the present embodiment is not limited to a particular device in terms of the implementations.

As shown in FIG. 3, the wireless terminal 300 according to the present embodiment includes a signal receiving porting 310, a signal processing portion 320, a memory portion 330 and a channel setting portion 340; however, the components included in the wireless terminal 300 according to the present embodiment are not limited thereto.

The signal receiving portion 310 is configured to receive a wireless signal transmitted from at least one surrounding wireless terminal. Such a signal receiving portion 310 may include a communications device (for example, an antenna) configured to receive the wireless signal and a modem device configured to convert the received wireless signal into a digital signal, as components thereof.

In an embodiment, the signal receiving portion 310 may receive a wireless signal including a MAC frame (Mac Protocol Data Unit, MPDU) as a wireless signal which is a candidate to be filtered. For instance, if the surrounding wireless terminal is an AP device and the wireless terminal 300 is an STA device, the signal receiving portion 310 may receive, as the wireless signal, a beacon signal transmitted from the surrounding wireless terminal or a probe response signal transmitted from the surrounding wireless terminal in response to a probe request signal transmitted from the wireless terminal 300.

In another embodiment, if the surrounding wireless terminal is an STA device and the wireless terminal 300 is an AP device, the signal receiving portion 310 may receive, as the wireless signal, a probe request signal transmitted from the surrounding wireless terminal.

The signal processing portion 320 refers to a device which extracts channel information corresponding to the surrounding wireless terminal based on the wireless signal received via the signal receiving portion 310 and performs adaptive filtering by determining whether the received signal is an adjacent channel interference signal to the respective wireless signal based thereon.

In an embodiment, the signal processing portion 320 parses the wireless signal received via the signal receiving portion 310 and extracts the channel information corresponding to the surrounding wireless terminal in the MAC frame of the wireless signal. To this end, the signal processing portion 320 may include a parser device (e.g. Information Element ID=0x3) as a component.

More specifically, the signal processing portion 320 may extract DSSS parameter set information included in the MAC frame of the wireless signal and extract the channel information corresponding to the surrounding wireless terminal based on the channel information included in the DSSS parameter set information. Herein, the parameter set information is set information of a variety of variables with respect to a data transmission method of the surrounding wireless terminals. For reference, in a case of a Wi-Fi environment, the DSSS parameter set information refers to parameter set information with respect to a 2.4 GHz band.

Such DSSS parameter set information includes frequency information with regard to a frequency band (Hz) which a surrounding wireless terminal is using. The frequency information may be center frequency information, and the signal processing portion 320 may identify which frequency band the surrounding wireless terminal is currently using, by means of the center frequency information.

Figure 5:
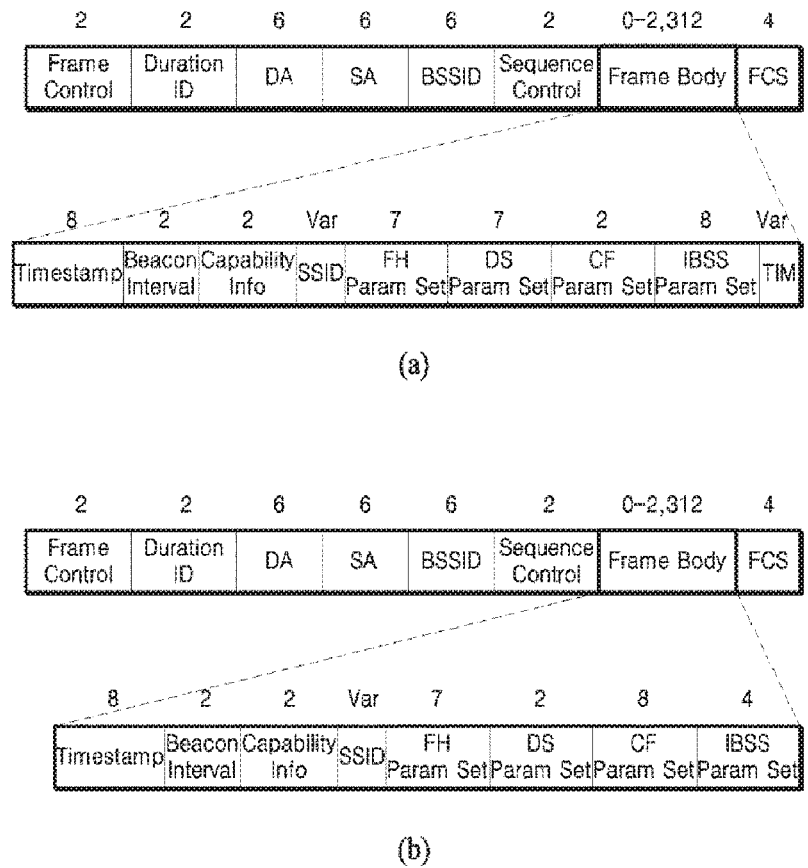
FIG. 5 is an exemplary diagram illustrating a method for extracting channel information in a wireless signal, according to an embodiment.

For instance, in a case that the surrounding wireless terminal is an AP device, the signal processing portion 320 receives a beacon signal, such as the signal shown in FIG. 5 (a). A beacon frame acquired by using the beacon signal may consist of beacon information, such as a timestamp, a beacon interval, capability information, a Service Set Identifier (SSID), a basic service set identifier (BSSID), a signal level (RSSI in dBm), supported rates, a set of a variety of variables (such as FH Parameter Set, DS Parameter Set, CF Parameter Set, IBSS Parameter Set), a Traffic Indication Map (TIM), etc. The signal processing portion 320 may extract the channel information corresponding to the surrounding wireless terminal by extracting the DSSS parameter set information from a set of the variety of variables in the beacon frame.

In another embodiment, when the surrounding wireless terminal is an STA device, the signal processing portion 320 receives a probe request signal such as the signal shown in FIG. 5 (b). Similarly, the signal processing portion 320 may extract the channel information corresponding to the surrounding wireless terminal by extracting the DSSS parameter set information from a set of the variety of variables in a probe frame acquired by using the probe request signal.

Figure 6:
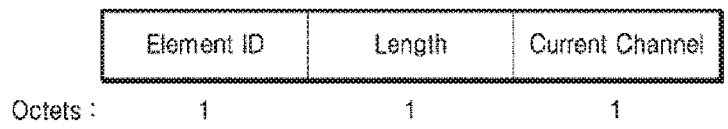
FIG. 6 is an exemplary diagram for illustrating DSSS parameter set information, according to an embodiment.

In the meantime, specific information with regard to the DSSS parameter set information extracted by the signal processing portion 320 can be identified by means of FIG. 6. That is, referring to FIG. 6, with the DSS parameter set information, it can be identified as to which frequency band is currently used by the channel of the surrounding wireless terminal.

The signal processing portion 320 compares the extracted channel information with regard to the surrounding wireless terminal to predetermined target channel information and performs adaptive filtering on the wireless signal according to the comparison result.

The signal processing portion 320 controls data of the wireless signal to be buffered in the memory area of the memory portion 330, when the target channel is identical to the channel corresponding to the surrounding wireless terminal.

In addition, the signal processing portion 320 regards the wireless signal as an adjacent channel interference signal and performs a filtering process in order for data of the wireless signal not to be buffered in the memory area of the memory portion 330, when the target channel is different from a channel corresponding to the surrounding wireless terminal.

Meanwhile, in an embodiment, the signal processing portion 320 controls a mode switch into a filtering mode in which adaptive filtering function is performed on the wireless signal. For instance, the signal processing portion 320 may control the wireless terminal 300 to always operate in the filtering mode or to adaptively switch a mode to the filtering mode based on size information (e.g. remaining space) of the buffering space in the memory area.

The memory portion 330 includes the memory area, and stores and provides data in the buffering space of the memory area.

In an embodiment, since buffering of an adjacent channel interference signal in the memory area of the memory portion 330 is blocked in advance, the buffer usage efficiency of the memory portion 330 can be maximized.

The channel setting portion 340 performs a function of collecting user setting information of a target channel to be permitted in association with data buffering to the memory area. Such a target channel may be a channel unique to the wireless terminal 300 differentiated from a channel corresponding to the surrounding wireless channel.

Figure 4:
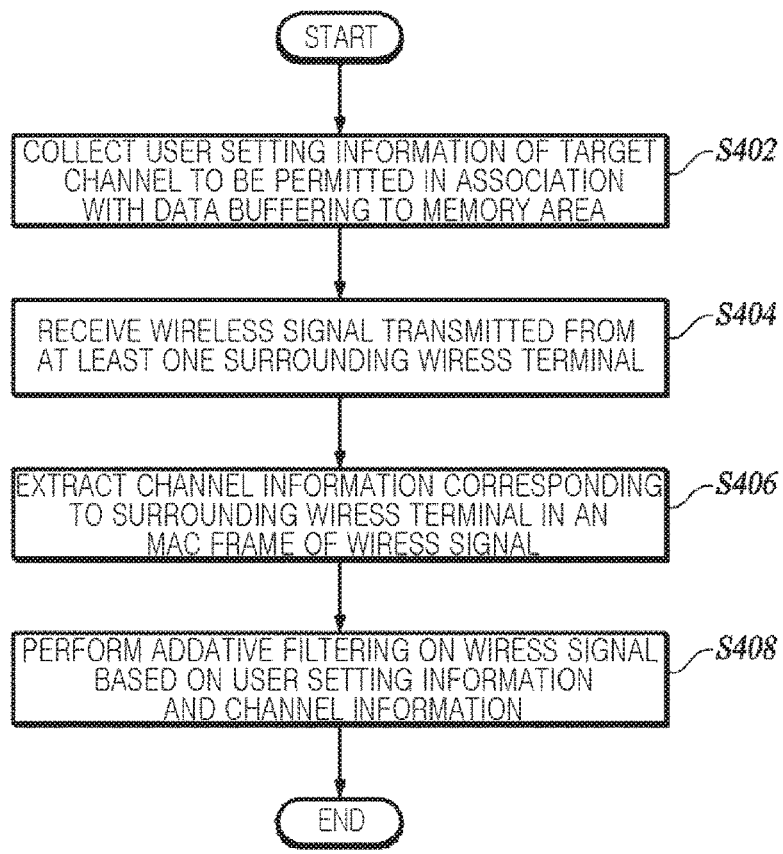
FIG. 4 is a flow chart illustrating a method for filtering a wireless signal, according to an embodiment.

FIG. 4 is a flow chart illustrating a method for filtering a wireless signal, according to an embodiment.

A wireless terminal 300 collects user setting information of a target channel to be permitted in association with data buffering to a memory area (i.e. S402). In step S402, the wireless terminal 300 may collect channel information with regard to the frequency band currently used by the wireless terminal 300 as the user setting information of the target channel.

The wireless terminal 300 receives a wireless signal transmitted from at least one surrounding wireless terminal (i.e. S404). In step S404, the wireless terminal 300 receives the wireless signal including a MAC frame from the surrounding wireless terminal. For instance, when the surrounding wireless terminal is an AP device, the wireless terminal 300 may receive, as the wireless signal, a beacon signal or a probe response signal transmitted from the surrounding wireless terminal.

In another embodiment, when the surrounding wireless terminal is an STA device, the wireless terminal 300 may receive, as the wireless signal, a probe request signal transmitted from the surrounding wireless terminal.

The wireless terminal 300 parses the wireless signal received in step S404 and extracts channel information corresponding to the surrounding wireless terminal in a MAC frame of the wireless signal (i.e. S406). In step S406, the wireless terminal 300 may extract DSSS parameter set information included in the MAC frame of the wireless signal and extract the channel information corresponding to the surrounding wireless terminal based on the channel information included in the DSSS parameter set information.

The wireless terminal 300 performs adaptive filtering on the wireless signal based on the user setting information collected in step S402 and the channel information extracted in step S406 (or S408). In step S408, when the target channel is identical to a channel corresponding to the surrounding wireless terminal, the wireless terminal 300 controls data of the wireless signal to be buffered in the memory area of the memory portion 330.

The wireless terminal 300 performs a filtering process in order for data of the wireless signal not to be buffered in the memory area, when the target channel is different from a channel corresponding to the surrounding wireless terminal.

Herein, steps S402 to S408 correspond to the operations of the respective components of the wireless terminal described above, and thus, are not further described in detail.

In FIG. 4, it is shown that the steps are sequentially performed. However, an embodiment is not limited thereto. In other words, it is possible to change the sequence or to perform one or more steps in parallel. Thus, FIG. 4 is not limited to a shown sequence.

As mentioned above, the method of filtering a wireless signal shown in FIG. 4 could be implemented with a program and recorded on a recording medium (such as CR-ROM, RAM, ROM, memory card, hard disk, magneto-optical disk, storage device, etc.) readable using a computer software.

The foregoing is merely an exemplary description of a technical spirit of an embodiment, and it will be apparent to one of ordinary skill in the art that various changes and modifications may be made without departing from the scope of the essential features of the embodiments. Accordingly, the embodiments are to be considered in a descriptive sense only, and not for purposes of limitation. The protection scopes of the embodiments are to be interpreted by the appended claims, and all the technical spirits within the equivalent range are to be construed as being included in the protection scopes of the embodiments.

REFERENCE NUMERALS ARE DESCRIBED AS FOLLOWS

300: wireless terminal
310: Signal Receiving Portion
320: Signal Processing Portion
330: Memory Portion
340: Channel Setting Portion

What is claimed is:
1. A wireless terminal, comprising:
a channel setting portion configured to collect user setting information of a target channel to be permitted in association with data buffering to a memory area;
a signal receiving portion configured to receive a wireless signal transmitted from at least one surrounding wireless terminal; and
a signal processing portion configured to parse the wireless signal so as to extract channel information corresponding to the surrounding wireless terminal in a Media Access Control (MAC) frame of the wireless signal and perform adaptive filtering on the wireless signal based on the user setting information and the channel information,
wherein the wireless signal is a beacon signal, a probe response signal or a probe request signal;
wherein the signal processing portion extracts the channel information corresponding to a frequency band currently used by the surrounding wireless terminal from the MAC frame of the wireless signal;
wherein the channel setting portion collects a frequency band currently used by the wireless terminal as the user setting information; and
wherein the signal processing portion controls data of the wireless signal to be buffered in the memory area when the frequency band currently used by the surrounding wireless terminal is identical to the frequency band currently used by the wireless terminal.

2. The wireless terminal according to claim 1, wherein the channel setting portion is configured to control a mode switch into a filtering mode in which adaptive filtering function is performed on the wireless signal based on size information of a buffering space in the memory area.

3. The wireless terminal according to claim 1, wherein the surrounding wireless terminal is an access point (AP) device, and the wireless signal is a beacon signal or a probe response signal.

4. The wireless terminal according to claim 1, wherein the surrounding wireless terminal is a station (STA) device, and the wireless signal is a probe request signal.

5. The wireless terminal according to claim 1, wherein the signal processing portion is configured to extract direct sequence spread spectrum (DSSS) parameter set information in the MAC frame and extract the channel information based on frequency information included in the DSSS parameter set information with regard to a frequency band, which the surrounding wireless terminal is using.

6. The wireless terminal according to claim 1, wherein the signal processing portion is configured to regard the wireless signal as an adjacent channel interference (ACI) signal and perform a filtering process in order for data of the wireless signal not to be buffered in the memory area, when the target channel is different from a channel corresponding to the surrounding wireless terminal.

7. A computer program stored in a computer-readable recording medium, the computer program, when combined with hardware, performs:
   a process of collecting user setting information of a target channel to be permitted in association with data buffering to a memory area;
   a process of receiving a wireless signal transmitted from at least one surrounding wireless terminal; and
   a process of parsing the wireless signal so as to extract channel information corresponding to the surrounding wireless terminal in a MAC frame of the wireless signal and performing adaptive filtering on the wireless signal based on the user setting information and the channel information,
      wherein the wireless signal is a beacon signal, a probe response signal or a probe request signal;
      wherein the process of parsing the wireless signal comprise:
   extracting the channel information corresponding to a frequency band currently used by the surrounding wireless terminal from the MAC frame of the wireless signal;
      wherein the process of collecting the user setting information comprise:
   collecting a frequency band currently used by the wireless terminal as the user setting information; and
      wherein the process of parsing the wireless signal comprise:
   controlling data of the wireless signal to be buffered in the memory area when the frequency band currently used by the surrounding wireless terminal is identical to the frequency band currently used by the wireless terminal.

8. A method for filtering a wireless signal, comprising the steps of:
   collecting user setting information of a target channel to be permitted in association with data buffering to a memory area;
   receiving a wireless signal transmitted from at least one surrounding wireless terminal; and
   parsing the wireless signal so as to extract channel information corresponding to the surrounding wireless terminal in a MAC frame of the wireless signal and performing adaptive filtering on the wireless signal based on the user setting information and the channel information,
      wherein the wireless signal is a beacon signal, a probe response signal or a probe request signal;
      wherein the parsing the wireless signal comprise:
   extracting the channel information corresponding to a frequency band currently used by the surrounding wireless terminal from the MAC frame of the wireless signal;
      wherein the collecting the user setting information comprise:
   collecting a frequency band currently used by the wireless terminal as the user setting information; and
      wherein the parsing the wireless signal comprise:
   controlling data of the wireless signal to be buffered in the memory area when the frequency band currently used by the surrounding wireless terminal is identical to the frequency band currently used by the wireless terminal.

* * * * *